(12) United States Patent
Felton

(10) Patent No.: US 7,637,364 B1
(45) Date of Patent: Dec. 29, 2009

(54) IDLER ROLLER ASSEMBLY

(75) Inventor: Jarrod J. Felton, Cyrus, MN (US)

(73) Assignee: Superior Industries, LLC, Morris, MN (US)

( * ) Notice: Subject to any disclaimer, the term of this patent is extended or adjusted under 35 U.S.C. 154(b) by 0 days.

(21) Appl. No.: 12/288,841

(22) Filed: Oct. 23, 2008

(51) Int. Cl.
*B65G 13/00* (2006.01)
(52) U.S. Cl. ............................................. 193/37
(58) Field of Classification Search ........... 193/35 R, 193/37; 492/47
See application file for complete search history.

(56) References Cited

U.S. PATENT DOCUMENTS

| | | | |
|---|---|---|---|
| 3,841,721 A * | 10/1974 | Coutant et al. | 193/37 |
| 4,136,768 A * | 1/1979 | Yateman et al. | 193/37 |
| 4,441,601 A * | 4/1984 | Rood | 193/37 |
| 4,673,380 A | 6/1987 | Wagner | |
| 4,955,462 A | 9/1990 | Bilodeau et al. | |
| 5,381,887 A * | 1/1995 | Emmons | 193/37 |
| 5,524,740 A * | 6/1996 | Conley | 193/37 |
| 5,527,705 A * | 6/1996 | Mussi et al. | 435/297.1 |
| 5,655,642 A | 8/1997 | Lawrence et al. | |
| 5,944,161 A | 8/1999 | Sealey | |
| 6,287,014 B1 * | 9/2001 | Salla | 193/37 |
| 7,028,825 B2 * | 4/2006 | Scott | 193/37 |

OTHER PUBLICATIONS

Brochure from Canning Conveyor Co., Ltd., "Canning Conveyor Rollers and Troughing Sets" www.canningconveyor.co.uk (Not Dated) (16 pages).

* cited by examiner

*Primary Examiner*—James R Bidwell
(74) *Attorney, Agent, or Firm*—Dicke, Billig & Czaja, PLLC

(57) ABSTRACT

An idler roller assembly is comprised of a polymeric tubular body and an end cap fitted within a cavity of the tubular body at each end of the tubular body. An inner circumferential surface of the tubular body defining the cavity is configured with a plurality of recesses to define first, second and third cavity portions, with the third cavity portion being adjacent to each end of the tubular body. The first and third cavity portions have an inner diameter that is greater than an inner diameter of the cavity, and the second cavity portion has an inner diameter greater than the inner diameter of the first and third cavity portions. An end cap configured to house a bearing race to support each end of the tubular body on a shaft is configured with a first end, a second end and an outer cylindrical wall therebetween. The outer cylindrical wall is stepped to provide first, second and third outer cylindrical surface portions sized to fit closely within the first, second and third cavity portions of the tubular body. The outer cylindrical wall is radially tapered between the first and second outer cylindrical surface portions to facilitate insertion of the end cap within the cavity of the tubular body.

13 Claims, 6 Drawing Sheets

IDLER ROLLER ASSEMBLY

BACKGROUND OF THE INVENTION

The present invention relates to an idler roller assembly for a belt conveyor system. In particular, the present invention relates to a polymeric idler roller with snap-fit end caps for housing shaft-mounted bearings on which the idler roller assembly rotates.

Belt conveyor systems for transporting bulk materials, such as sand, gravel, and the like, utilize idler roller assemblies rotatably mounted on an elongate frame to support a motor-driven endless conveyor belt at various locations along the length of the frame. Typically, idler roller assemblies generally have comprised metal cylindrical tubes sealed at each end by a metal cap that is welded to the metal tube. Housed within each metal cap are bearings which are supported on a shaft. The shafts of one or more idler roller assemblies are mounted to support the conveyor belt in a desired configuration as the belt travels along the frame. Metal idler roller assemblies are durable, but they are noisy and add considerable weight to a belt conveyor system. Also, some bulk materials are prone to adhering to metal idler rollers, which can cause belt alignment problems, corrosion of the metal roller and increased wear of the conveyor belt.

Idler roller assemblies are also known in which the cylindrical tube and end caps are formed from a polymer. Assembly of such roller assemblies is time consuming, involving the use of adhesives to secure the end caps to the tube. Also, separate molds are required to produce idler roller assemblies having different lengths. There is a continuing need for improved idler roller assemblies formed from polymeric materials that are quick and easy to manufacture with varying lengths.

BRIEF SUMMARY OF THE INVENTION

The present invention is a polymeric idler roller assembly comprising a polymeric tubular body and a polymeric end cap. The polymeric tubular body has a cylindrical wall, a first end and a second end. The cylindrical wall defines an outer cylindrical surface and an inner cylindrical surface. The inner cylindrical surface defines a cavity having a first inner diameter and is configured to define a plurality of recesses in the cavity adjacent to each of the first and second ends of the tubular body. First and second recesses of the plurality of recesses have an inner diameter that is greater than the first inner diameter. A third recess of the plurality of recesses is located between the first and second recesses and has an inner diameter that is greater than the inner diameter of the first and second recesses. A polymeric end cap is positioned within the cavity of the tubular body adjacent to each of the first and second ends of the tubular body. Each end cap comprises an outer cylindrical wall, and inner cylindrical wall, a first end, a second end and an end wall connected between the outer and inner cylindrical walls at the second end of the end cap. The outer cylindrical wall of the end cap comprises first, second and third outer surface portions with first, second and third outer diameters, respectively, that approximate the respective inner diameters of the first second and third recesses of the tubular body. The first, second and third outer surface portions are positioned within the first, second and third recesses of the tubular body to secure the end cap to the tubular body.

DETAILED DESCRIPTION

Figure 1:
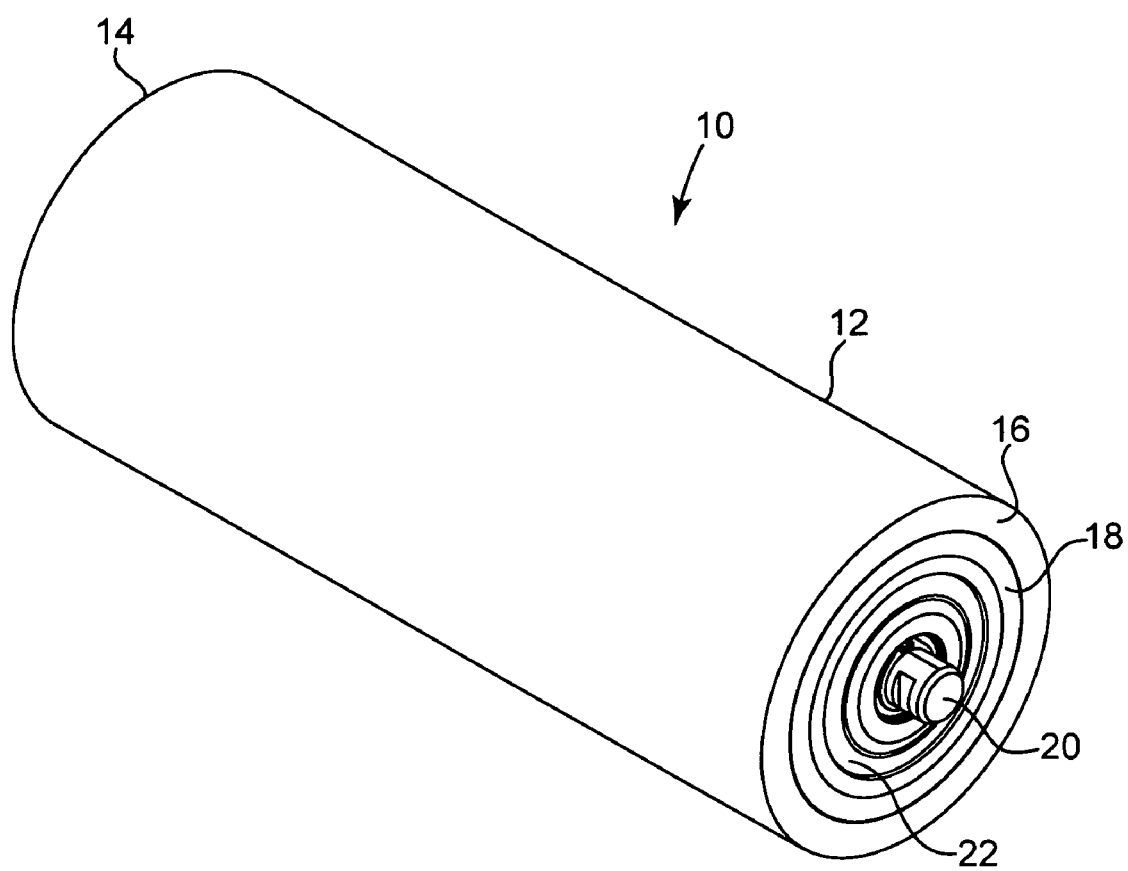
FIG. 1 is a perspective view of an idler roller assembly of the present invention.

An embodiment of the idler roller assembly 10 of the present invention is shown generally in FIG. 1. In this embodiment, idler roller assembly 10 generally comprises a tubular body 12 having ends 14 and 16, an end cap 18 mounted within tubular body 12 flush with ends 14 and 16, and a shaft 20 which extends through openings in each end cap 18 for mounting to a support frame on a belt conveyor system. Shaft 20 carries the tubular body 12 and end cap 18 on a set of bearings (not shown) mounted within end cap 18 and covered by a dust cover 22, as will be more fully described herein.

Figure 2:
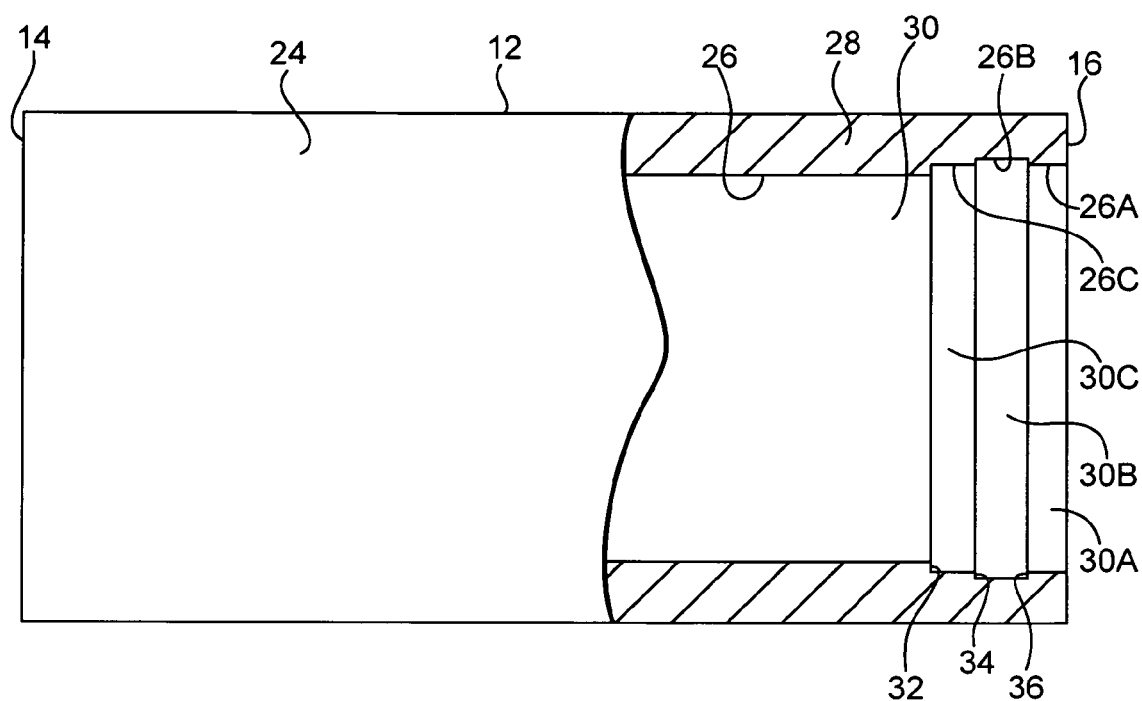
FIG. 2 is a side view of a tube of the idler roller assembly of FIG. 1 with one end portion of the tube shown in longitudinal cross-section.

FIG. 2 shows a side view of tubular body 12 with a portion adjacent end 16 shown in cross-section. Tubular body 12 comprises an outer surface 24 and an inner surface 26 which together define a cylindrical wall 28 that extends from end 14 to end 16. In one embodiment, wall 28 has a thickness of about 0.5 inches to about 1.0 inches. Inner surface 26 defines a cavity 30 that is exposed at ends 14 and 16. Tubular body 12 is formed from a suitable polymer, such as high density polyethylene (HDPE), in an extrusion process. As such, tubular body 12 has a length from end 14 to end 16 which may be varied according to the particular application for a given belt conveyor system. In one embodiment, HDPE is extruded to define a tubular body 12 having a length of X feet. Subsequently, tubular body 12 is cut to the desired length for the given application. One such application is a troughing idler system for supporting a conveyor belt, in which case tubular body 12 may have a length of about 13.0 inches. Another such application is a return idler system, in which case tubular body 12 may have a length of about 18.0 inches to about 72.0 inches. An exemplary outer diameter of tubular body 12 is about 5.0 inches to about 6.0 inches.

Once tubular body 12 is formed at the desired length, the inner surface 26 is machined adjacent to ends 14 and 16 to define steps in wall 28. As shown in FIG. 2, in one embodiment, the machined steps define a first cavity portion 30A immediately adjacent end 16, a second cavity portion 30B immediately adjacent cavity portion 30A, and a third cavity portion 30C immediately adjacent cavity portion 30B. Tubular body 12 is similarly machined adjacent end 14. The corresponding inner surfaces 26A, 26B, 26C of cavity portions 30A, 30B, 30C, respectively, are generally cylindrical and coaxial with inner surface 26 of tubular body 12. The inner diameter of cavity portions 30A and 30C are generally equal in size, while the inner diameter of cavity portion 30B is greater than cavity portions 30A and 30C. The inner diameter of cavity portion 30C is greater than the inner diameter of cavity 30. As such, cavity portion 30C defines a radial shoulder 32 which faces end 16, and cavity portion 30B defines facing radial shoulders 34 and 36. In one exemplary embodiment, cavity portion 30A has an inner diameter of about 4.000 inches, cavity portion 30B has an inner diameter of about 4.120 inches, and cavity portion 30C has an inner diameter of about 4.000 inches. Further, in one exemplary embodiment cavity portion 30A has a width of about 0.369 inches, cavity portion 30B has a width of about 0.500 inches, and cavity portion 30C has a width of about 0.432 inches. Cavity portions 30A, 30B and 30C define a docking site for coupling end cap 18 to tubular body 12, as will be more fully described herein.

Figure 3:
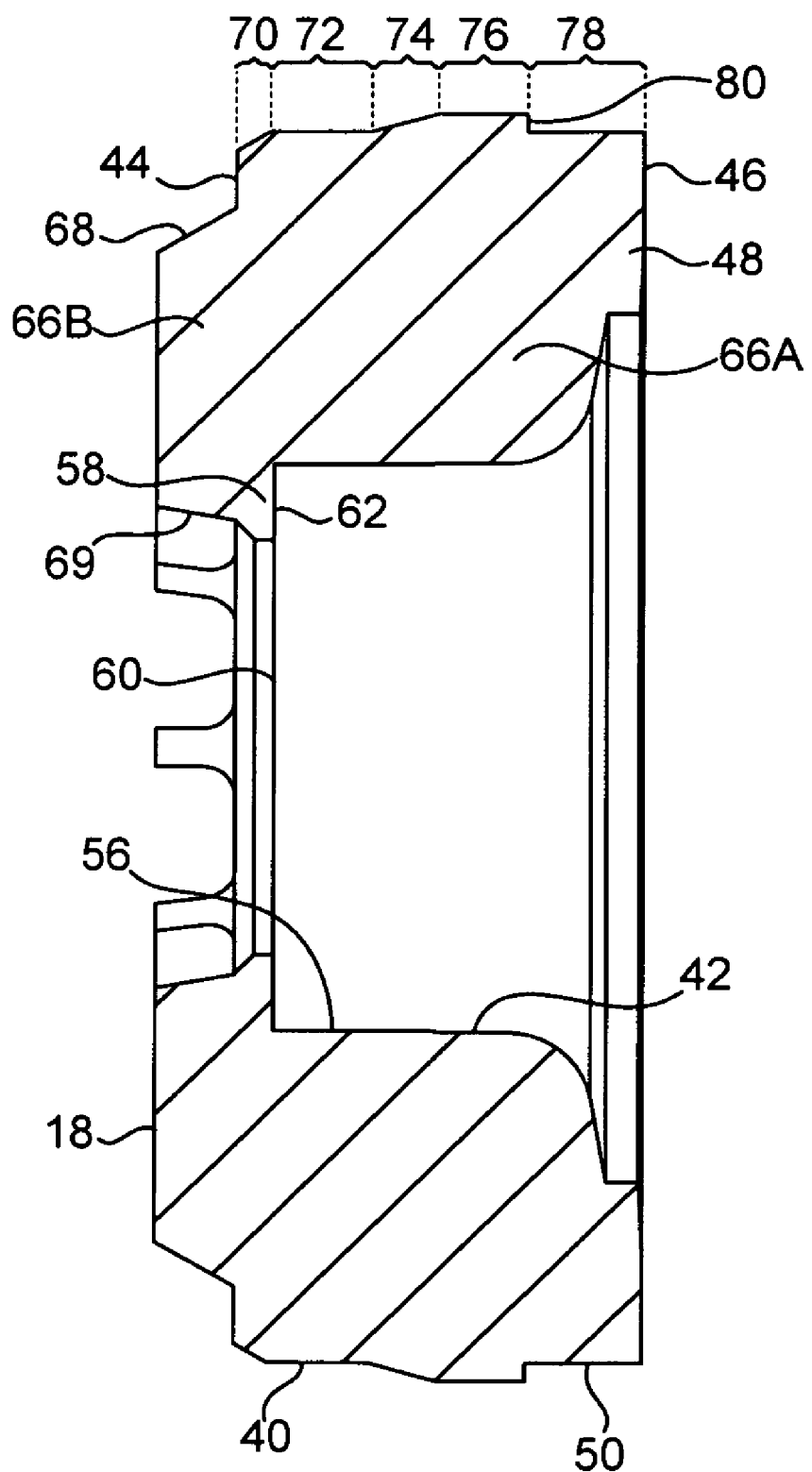
FIG. 3 is a longitudinal cross-sectional view of an end cap of the idler roller assembly of FIG. 1.
Figure 3A:
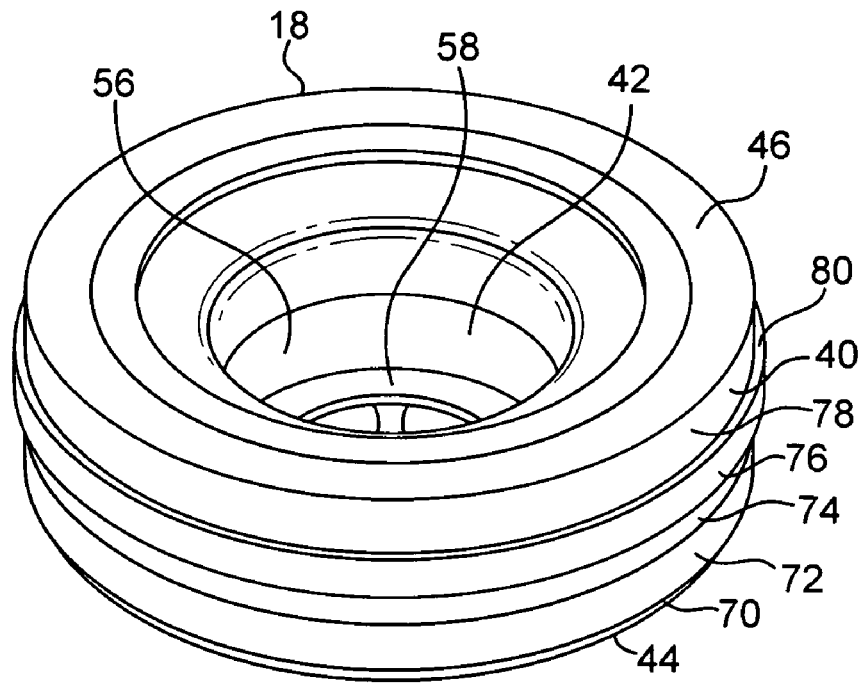
FIG. 3A is a perspective view of the end cap from an outer end of the end cap.
Figure 3B:
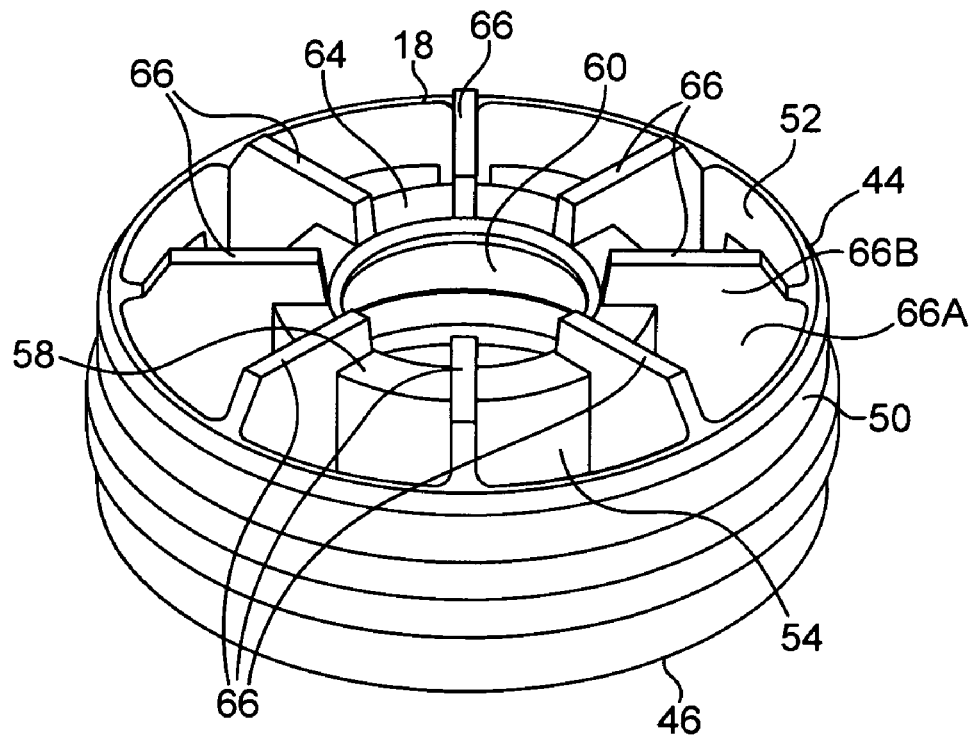
FIG. 3B is a perspective view of the end cap from and inner end of the end cap.

FIGS. 3, 3A and 3B show end cap 18 in longitudinal cross-section and end perspective views of opposite ends of end cap 18, respectively. End cap 18 generally comprises a composite cylindrical body having an outer cylindrical wall 40, an inner cylindrical wall 42 radially spaced from and generally coaxial with the outer cylindrical wall 40, a first end 44, a second end 46 and an end wall 48 which extends between the inner cylindrical wall 42 and the outer cylindrical wall 40 adjacent to the second end 46. The outer cylindrical wall 40 includes an outer surface 50 and an inner surface 52. Likewise, the inner cylindrical wall 42 includes an outer surface 54 and an inner surface 56. Integrally connected to the inner cylindrical wall 42 at the first end 44 is a radial wall 58 which extends radially inward from the inner cylindrical wall 42 and defines an opening 60 at the first end 44 of end cap 18. Radial wall 58 comprises an outer surface 62, which faces toward second end 46 and an inner surface 64 which faces toward first end 44.

Integrally connected to and between the outer cylindrical wall 40, inner cylindrical wall 42, end wall 48 and radial wall 58 are a plurality of radially spaced ribs 66. Ribs 66 include a first planar portion 66A, which extends between and is integrally formed with the inner surface 50 of the outer cylindrical wall 40 and the outer surface 56 of the inner cylindrical wall 42, and a second planar portion 66B which is integrally formed with the inner surface 64 of radial wall 58. The first planar portion 66A further is integrated into the end wall 48 (FIG. 3). The second planar portion 66B extends rearward of first end 44 and has a radially tapered outer edge 68 and a radially tapered inner edge 69. Outer edges 68 and 69 converge toward one another. Ribs 66 provide structural support to the respective walls 40, 42, 48 and 58 of end cap 18. In one embodiment, end cap 18 comprises eight generally equally radially spaced ribs 66. In an alternate embodiment, end cap 18 comprises twelve generally equally radially spaced ribs 66. In one embodiment, end cap 18 is formed by molding a suitable polymer, such as HDPE, using known molding techniques. In one exemplary embodiment walls 40, 42, 48 and 58 and ribs 66 have a wall thickness of about 0.125 inches to about 0.187 inches. The relatively thin wall and rib structure of end cap 18 makes end cap 18 relatively light in weight and yet imparts radial structural integrity adequate to support the tubular body 12.

As shown in FIGS. 3 and 3A, the outer surface 50 of outer wall 40 is configured with various tapers. Immediately adjacent to first end 44 of end cap 18, there is a radially tapered surface portion 70, which has a gradually increasing outer diameter relative to the outer diameter of first end 44. The outer diameter of first end 44 is selected to be smaller than the inner diameter of cavity portion 30A of tubular body 12, but greater than the inner diameter of cavity 30 of tubular body 12. Immediately adjacent to surface portion 70 is a first cylindrical surface portion 72 of outer surface 50, which has a relatively constant outer diameter. In general, the outer diameter of the first cylindrical surface portion 72 is selected to approximate the inner diameter of cavity portion 30C of tubular body 12.

Immediately adjacent to surface portion 72 is a ramped surface portion 74, which has a gradually increasing outer diameter relative to surface portion 72. Immediately adjacent to ramped surface portion 74 is a second cylindrical surface portion 76, which has a relatively constant outer diameter that is greater than that of the first cylindrical surface portion 72. In general, the outer diameter of the second cylindrical surface portion 76 is selected to approximate the inner diameter of cavity portion 30B of tubular body 12. Immediately adjacent to the second cylindrical surface portion 76 is a third cylindrical surface portion 78, which has a relatively constant outer diameter that is smaller than the outer diameter of the second cylindrical surface portion 76. In general, the outer diameter of the third cylindrical surface portion 78 is selected to approximate the inner diameter of cavity portion 30A of tubular body 12. Outer surface 50 transitions from the second cylindrical surface portion 76 to the third cylindrical surface portion 78 via a transverse surface that defines a radial shoulder 80. In one exemplary embodiment, the outer diameter of the first cylindrical surface portion 72 and the third cylindrical surface portion 78 is about 4.020 inches and the outer diameter of the second cylindrical surface portion 76 is about 4.140 inches. Further, in one exemplary embodiment, the combined width of surface portions 70 and 72 are selected to generally equal the width of cavity portion 30C of tubular body 12; the combined width of surface portions 74 and 76 are selected to be generally equal to the width of cavity portion 30B; and the width of surface portion 78 is selected to be generally equal to the width of cavity portion 30A.

Figure 4:
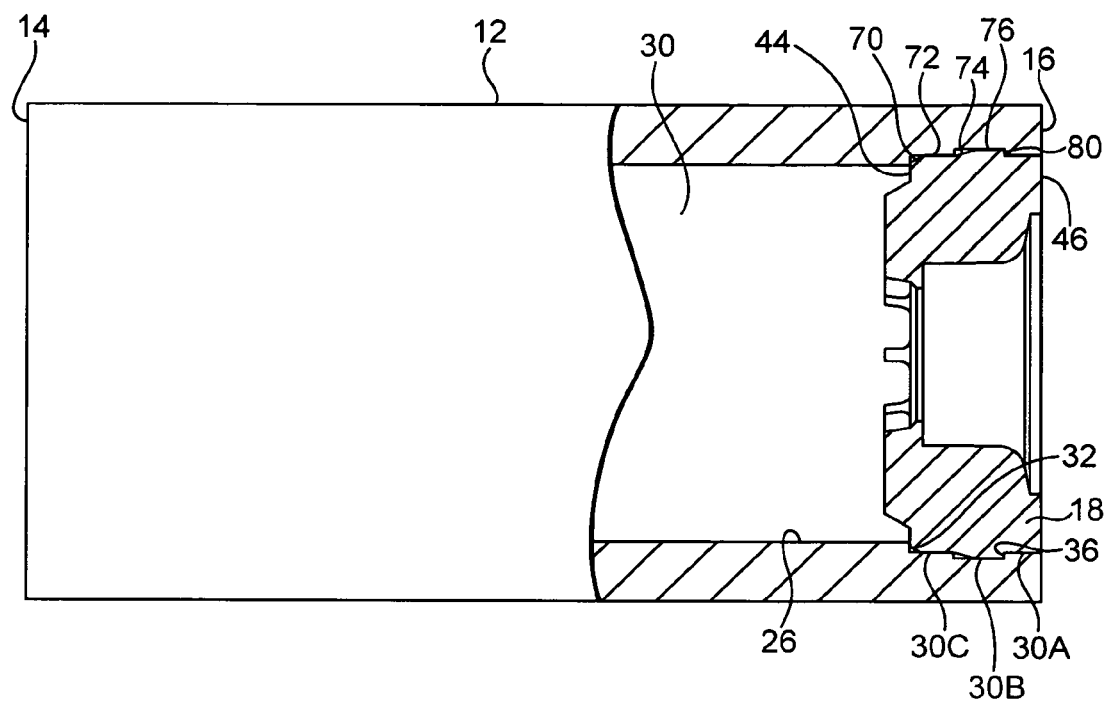
FIG. 4 is a partial cross-sectional side view of the tube and end cap of the idler roller assembly with the end cap mounted to the tube.

FIG. 4 shows a partial cross-sectional view of end 16 of tubular body 12 with end cap 18 fitted within cavity 30. End cap 18 is installed within cavity 30 by inserting end 44 within cavity 30A. The radially tapered outer surface portion 70 facilitates this initial insertion step. Sufficient axial force is exerted on end 46 of end cap 18 to move end 44 of end cap 18 toward cavity 30C. As end 44 of end cap 18 enters cavity 30A, the first cylindrical surface portion 72 of end cap 18 functions to guide the travel of end cap 18 along the inner surface 26A of cavity portion 30A until the ramped surface portion 74 engages the inner surface 26A of cavity portion 30A. Under sufficient axial force, plastic deformation of tubular body 12 and end cap 18 allows movement of the second cylindrical surface portion 76 through cavity 30A and into cavity 30B. As the second cylindrical surface portion 76 begins to enter cavity 30B, the first cylindrical surface portion 72 is in engagement with the inner surface 26C of cavity portion 30C, which functions to keep end cap 18 coaxially aligned throughout the installation of end cap 18. When end 44 of end cap 18 contacts radial shoulder 32 in cavity portion 30C, the radial shoulder 80 of end cap 18 axially engages radial shoulder 36 of cavity 30B thereby locking end cap 18 within cavity 30 with end 46 of end cap 18 in a generally common plane flush with end 16 of tubular body 12. Thus the axial locking mechanism of the present invention is stabilized by opposing cylindrical surfaces (i.e., first and third cylindrical surface portions 72 and 78) on either side of the captured second cylindrical surface portion 76.

Figure 5:
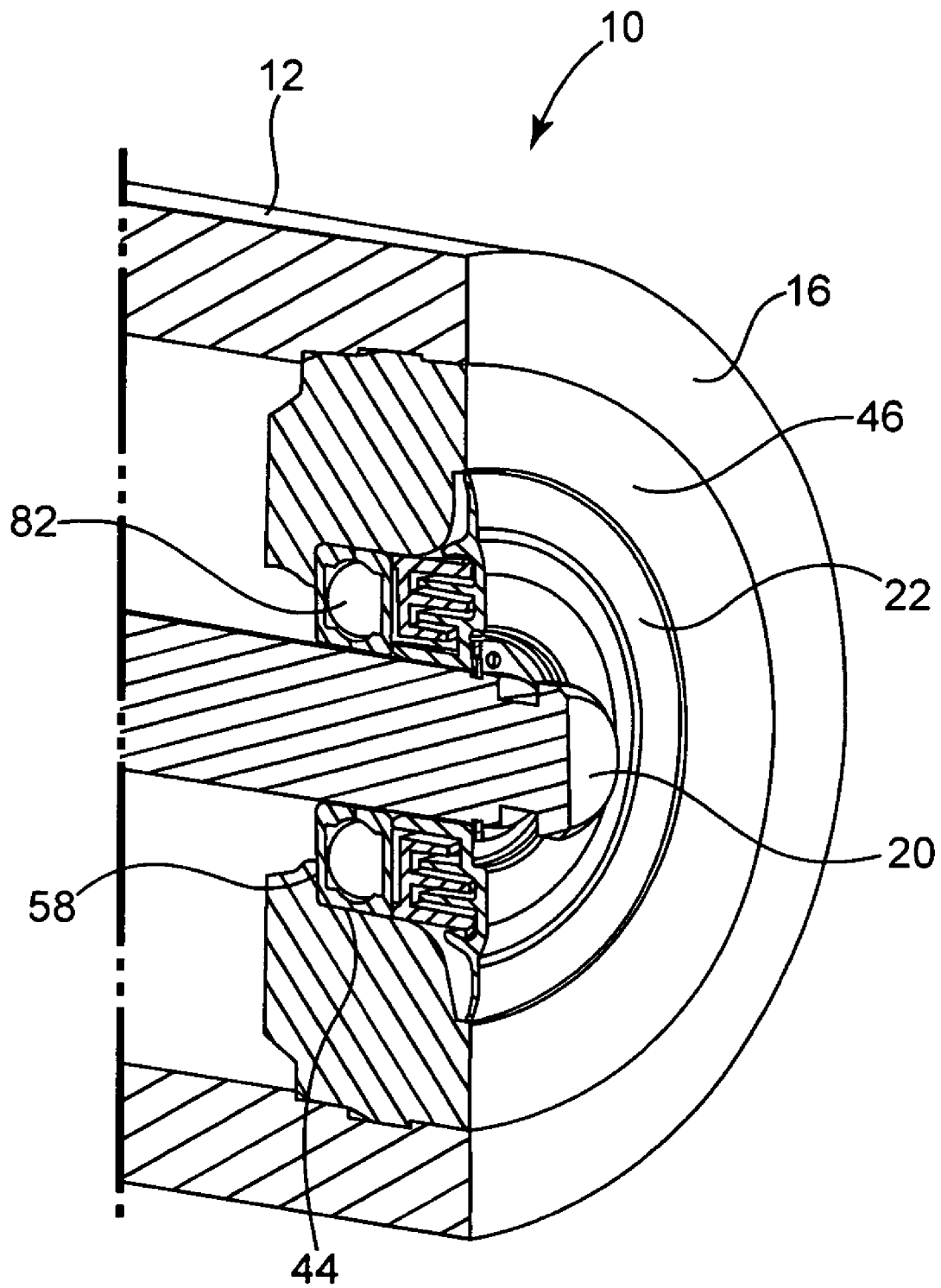
FIG. 5 is a partial cross-sectional view of an assembled idler roller assembly of the present invention.

As shown in FIG. 5, once end cap 18 is secured within tubular body 12, final assembly of idler roller assembly 10 involves fitting a bearing race 82 within the inner cylindrical wall 42 and against radial wall 58 of end cap 18. A shaft 20 is fitted within each bearing race 82 in a conventional manner. Each bearing race 82 is then covered with a suitable dust cover 22 which is secured relative to shaft 20 with a retaining clip that seats within in a groove formed in the shaft outer surface a manner known in the art. One such dust cover is made by Superior Industries under the brand name SPIN- GUARD®. In one embodiment, dust cover 22 has an outer surface that is configured to lie in the same general plane as end 16 of tubular body 12 and end 46 of end cap 18. The resulting construction of tubular body 12, end cap 18 and dust cover 22 defines a flat end surface of idler roller assembly 10 which aids in eliminating a build-up of transported material coming in contact with idler roller assembly 10. Further, the internal mounting of end cap 18 so as to be flush with each end of tubular body 12 ensures that no radial impact forces from objects being transported on a conveyor belt will be able to act on an exposed portion of an end cap. All such forces are absorbed via the composite idler roller assembly. Thus damage to idler roller end caps and bearings is minimized.

The idler roller assembly of the present invention is easy to manufacture and assemble without the use of adhesives to secure the end cap to the tubular body. The method of extruding the tubular body and machining the inner circumferential surface of the tubular body adjacent each end of the tubular body to define a docking site for end caps conveniently allows the idler roller assembly to be constructed at different lengths without the need for separate molds. The configuration of the outer wall of the end cap allows the end cap to be supported and guided relative to the inner cylindrical surface of the tubular body throughout the installation of the end cap. The elevated central portion of the end cap outer wall serves to secure the end cap within a corresponding cavity of the tubular body, with adjacent flanking surface portions of the end cap outer wall supporting end cap 18 relative to tubular body 12. The completely internal mounting of end cap 18 flush with each end of tubular body 12 protects the end cap and bearings from radial forces and aids in minimizing and preventing material build-up on the end of the idler roller assembly.

Although the present invention has been described with reference to preferred embodiments, workers skilled in the art will recognize that changes may be made in form and detail without departing from the spirit and scope of the invention.

The invention claimed is:

1. An idler roller assembly comprising:
   a polymeric tubular body having a cylindrical wall, a first end and a second end, the cylindrical wall defining an outer cylindrical surface and an inner cylindrical surface, the inner cylindrical surface defining a cavity having a first inner diameter, the inner cylindrical surface configured to define a plurality of recesses in the cavity adjacent to each of the first and second ends of the tubular body, first and second recesses of the plurality of recesses having an inner diameter that is greater than the first inner diameter, a third recess of the plurality of recesses being located between the first and second recesses and having an inner diameter that is greater than the inner diameter of the first and second recesses;
   a polymeric end cap positioned within the cavity of the tubular body adjacent to each of the first and second ends of the tubular body, the end cap comprising an outer cylindrical wall, and inner cylindrical wall, a first end, a second end and an end wall connected between the outer and inner cylindrical walls at the second end of the end cap, the outer cylindrical wall comprising first, second and third outer surface portions with first, second and third outer diameters, respectively, that approximate the inner diameters of the first second and third recesses of the tubular body, the first, second and third outer surface portions positioned within the first, second and third recesses of the tubular body.

2. The idler roller assembly of claim 1, wherein an end portion of the first outer surface portion of the outer cylindrical wall of the end cap is adjacent to the first end of the end cap, the end portion of the first outer surface portion having a radially increasing outer diameter relative to an outer diameter of the end cap first end.

3. The idler roller assembly of claim 2, wherein second and third outer surface portions of the outer cylindrical wall of the end cap comprise a generally cylindrical outer surface, the second and third outer surface portions contacting the first and second recesses of the tubular body.

4. The idler roller assembly of claim 3, wherein the second outer surface portion further comprises a radially tapered outer surface portion between the generally cylindrical outer surface and the first outer surface portion.

5. The idler roller assembly of claim 4, wherein the tubular body further comprises a first radial shoulder between the cavity inner surface and the first cavity recess, the first radial shoulder configured to engage the first end of the end cap when the first, second and third outer surface portions are positioned within the first, second and third recesses of the tubular body.

6. The idler roller assembly of claim 5, wherein the tubular body further comprises a second radial shoulder between the second and third recesses and wherein the end cap comprises a radial shoulder between the second and third outer surface portions, the second radial shoulder of the tubular body engaging the radial shoulder of the end cap when the second outer surface portion of the end cap is positioned within the second recess of the tubular body.

7. The idler roller assembly of claim 1, wherein the second end of each end cap is generally in a plane common with a respective one of the first and second ends of the tubular body.

8. A method of making an idler roller assembly comprising:
   extruding a polymer to form a tube having a cylindrical wall defining an outer cylindrical surface and an inner cylindrical surface generally coaxial with the outer cylindrical surface, the inner cylindrical surface defining a cavity having a first inner diameter;
   cutting the tube to a desired length to form a tubular body having a first end and a second end;
   machining the inner cylindrical surface of the tubular body adjacent to each of the first and second ends to define first second and third cavity recesses, the first and third cavity recesses defining first and third spaced cavity portions, respectively, the third cavity portion being adjacent to a respective one of the first and second ends, each of the first and third cavity portions having a second inner diameter that is greater than the first inner diameter of the cavity, the second cavity recess defining a second cavity portion between the first and third cavity portions, the second cavity portion having a third inner diameter that is greater than the second inner diameter of the first and third cavity portions;
   providing first and second polymeric end caps each configured to house a bearing race, each end cap having a first end, a second end and an outer cylindrical wall configured with first, second and third outer cylindrical surface portions, the first end of the cap generally being adjacent to the first outer cylindrical surface portion and the second end of the cap being adjacent to the third outer cylindrical surface portion, the first, second and third outer cylindrical surface portions each having an outer diameter that approximates the respective inner diameters of the first, second and third cavity portions, wherein the outer cylindrical wall radially tapers from the first outer cylindrical surface portion to the second outer cylindrical surface portion;

inserting the first end of each end cap into the third cavity portion of the tubular body;

applying a force to the second end of each end cap sufficient to move the first end of the end cap toward the first cavity portion of tubular body until the first, second and third outer cylindrical surface portions of the end cap seat within the first, second and third cavity portions, respectively.

9. The method of claim 8 wherein the step of providing first and second end caps further comprises providing the first end of each end cap with an outer diameter that is greater than the first inner diameter of the tubular body cavity and that is less than the second inner diameter of the first cavity portion, and wherein the step of machining comprises forming a first radial shoulder between the cavity of the tubular body and first cavity portion, and wherein the step of applying a force comprises moving the first end of the end cap into engagement with the first radial shoulder.

10. The method of claim 9 wherein the step of machining comprises providing first and second end caps further comprises forming a second radial shoulder between the second and third cavity portions, and wherein the step of providing first and second end caps further comprises forming a radial shoulder between the second and third outer cylindrical surface portions, and wherein the step of applying a force comprises moving the radial shoulder of each end cap into engagement with each second radial shoulder of the tubular body when the first end of the end cap is in engagement with the first radial shoulder.

11. A method of making an idler roller assembly comprising:

providing a polymeric tubular body having a first end, a second end and a cylindrical wall defining an outer cylindrical surface and an inner cylindrical surface generally coaxial with the outer cylindrical surface, the inner cylindrical surface defining a cavity having a first inner diameter, the inner cylindrical surface configured to define first second and third cavity recesses adjacent to each of the first and second ends, the first and third cavity recesses defining first and third spaced cavity portions, respectively, the third cavity portion being adjacent to a respective one of the first and second ends, each of the first and third cavity portions having a second inner diameter that is greater than the first inner diameter of the cavity, the second cavity recess defining a second cavity portion between the first and third cavity portions, the second cavity portion having a third inner diameter that is greater than the second inner diameter of the first and third cavity portions;

providing first and second polymeric end caps each configured to house a bearing race, each end cap having a first end, a second end and an outer cylindrical wall configured with first, second and third outer cylindrical surface portions, the first end of the cap generally being adjacent to the first outer cylindrical surface portion and the second end of the cap being adjacent to the third outer cylindrical surface portion, the first, second and third outer cylindrical surface portions each having an outer diameter that approximates the respective inner diameters of the first, second and third cavity portions, wherein the outer cylindrical wall radially tapers from the first outer cylindrical surface portion to the second outer cylindrical surface portion;

inserting the first end of each end cap into the third cavity portion of the tubular body;

applying a force to the second end of each end cap sufficient to move the first end of the end cap toward the first cavity portion of tubular body until the first, second and third outer cylindrical surface portions of the end cap seat within the first, second and third cavity portions, respectively.

12. The method of claim 11 wherein the step of providing first and second end caps further comprises providing the first end of each end cap with an outer diameter that is greater than the first inner diameter of the tubular body cavity and that is less than the second inner diameter of the first cavity portion, and wherein the step of machining comprises forming a first radial shoulder between the cavity of the tubular body and first cavity portion, and wherein the step of applying a force comprises moving the first end of the end cap into engagement with the first radial shoulder.

13. The method of claim 12 wherein the step of machining comprises providing first and second end caps further comprises forming a second radial shoulder between the second and third cavity portions, and wherein the step of providing first and second end caps further comprises forming a radial shoulder between the second and third outer cylindrical surface portions, and wherein the step of applying a force comprises moving the radial shoulder of each end cap into engagement with each second radial shoulder of the tubular body when the first end of the end cap is in engagement with the first radial shoulder.

\* \* \* \* \*